United States Patent [19]
Sanui et al.

[11] Patent Number: 5,730,783
[45] Date of Patent: Mar. 24, 1998

[54] OZONE CONCENTRATING PROCESS

[75] Inventors: Hiroshi Sanui; Nobuhiko Takahashi; Shigeyuki Yamamoto, all of Kanagawa, Japan

[73] Assignee: Nippon Sanso Corporation, Tokyo, Japan

[21] Appl. No.: 716,323

[22] PCT Filed: Feb. 5, 1996

[86] PCT No.: PCT/JP96/00228

§ 371 Date: Oct. 4, 1996

§ 102(e) Date: Oct. 4, 1996

[87] PCT Pub. No.: WO86/24554

PCT Pub. Date: Aug. 15, 1996

[30] Foreign Application Priority Data

| Feb. 6, 1995 | [JP] | Japan | 7-018264 |
| Mar. 3, 1995 | [JP] | Japan | 7-043984 |
| Mar. 3, 1995 | [JP] | Japan | 7-044040 |
| Mar. 3, 1995 | [JP] | Japan | 7-044178 |

[51] Int. Cl.[6] .................... B01D 53/04
[52] U.S. Cl. ............. 95/115; 95/138; 95/11; 95/21
[58] Field of Search ............ 62/617, 636; 95/114, 95/115, 138, 148, 11, 21

[56] References Cited

U.S. PATENT DOCUMENTS

| 3,134,656 | 5/1964 | Donohue et al. ............ 95/138 |
| 3,377,812 | 4/1968 | Garrett et al. ............ 95/148 X |
| 3,890,121 | 6/1975 | Thomas ............ 95/115 |
| 4,612,022 | 9/1986 | Berry ............ 95/115 X |
| 4,786,489 | 11/1988 | Grenier et al. ............ 95/138 X |
| 5,039,314 | 8/1991 | Lehner et al. ............ 95/138 X |
| 5,507,957 | 4/1996 | Garrett et al. ............ 95/138 X |
| 5,626,033 | 5/1997 | Tamhankar et al. ............ 62/617 |

FOREIGN PATENT DOCUMENTS

| 4314942 | 11/1994 | Germany ............ 95/138 |
| 50-116389 | 9/1975 | Japan . |
| 52-115998 | 9/1977 | Japan . |
| 52-039793 | 10/1977 | Japan ............ 95/138 |
| 52-134874 | 11/1977 | Japan . |
| 53-64690 | 6/1978 | Japan . |
| 55-047202 | 4/1980 | Japan ............ 95/138 |
| 55-98397 | 7/1980 | Japan . |
| 55-152530 | 11/1980 | Japan ............ 95/138 |
| 56-168824 | 12/1981 | Japan ............ 95/138 |
| 3-016638 | 1/1991 | Japan ............ 95/138 |
| 4-29712 | 1/1992 | Japan . |

*Primary Examiner*—Robert Spitzer
*Attorney, Agent, or Firm*—Armstrong, Westerman, Hattori, McLeland & Naughton

[57] ABSTRACT

A process for concentrating ozone, which includes switching a plurality of adsorption columns each packed with an adsorbent capable of preferentially adsorbing ozone thereon sequentially to an adsorption step where the adsorbent is maintained at a low temperature to adsorb ozone thereon; a desorption step where the adsorbent is heated to desorb ozone therefrom, and a scavenger gas is introduced in a substantially fixed amount into the adsorption column to discharge the thus desorbed ozone being carried on the scavenger gas; and a cooling step where the adsorbent having completed the desorption step is cooled to the same low temperature level as in the adsorption step. Heating of the adsorbent in the desorption step is carried out depending on the time elapsed after desorption is started or on the ozone concentration of the gas discharged from the adsorption column performing the desorption step. A gas having a predetermined pressure is employed as the scavenger gas in the desorption step. The adsorption step is divided into two steps: a pre-adsorption sub-step and a main adsorption sub-step. A low-temperature oxygen is employed as a cooling source in the cooling step and then supplied as a raw material of ozone to the ozonizer.

8 Claims, 4 Drawing Sheets

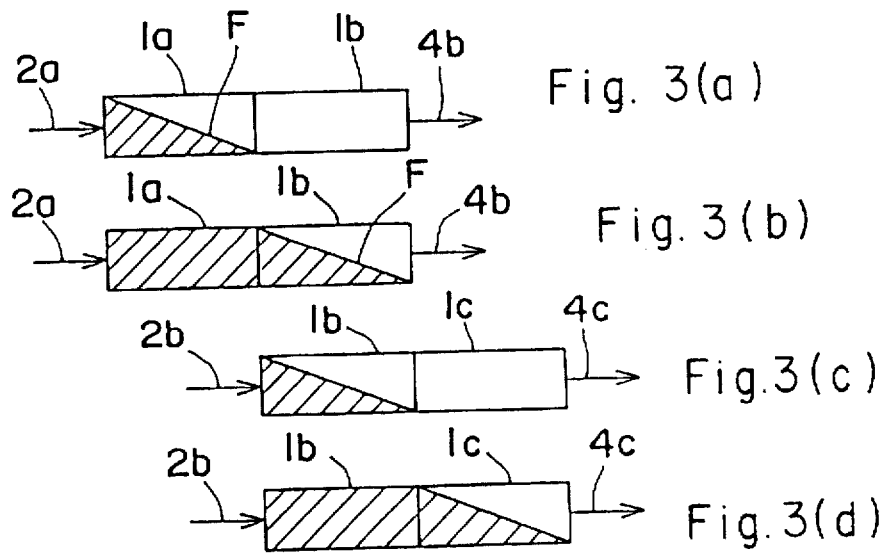
Fig. 3(a)
Fig. 3(b)
Fig. 3(c)
Fig. 3(d)
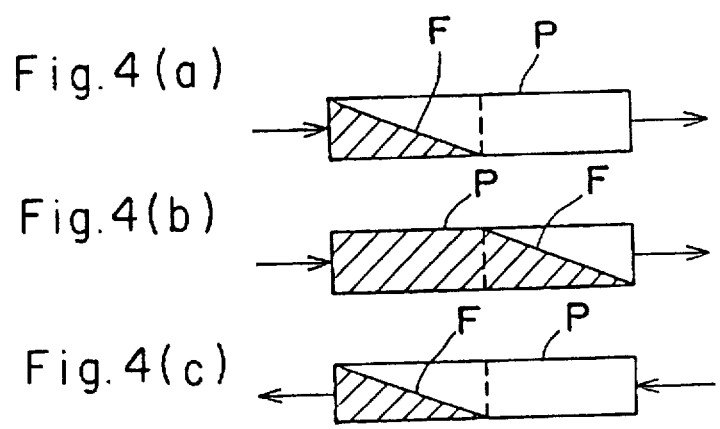
Fig. 4(a)
Fig. 4(b)
Fig. 4(c)

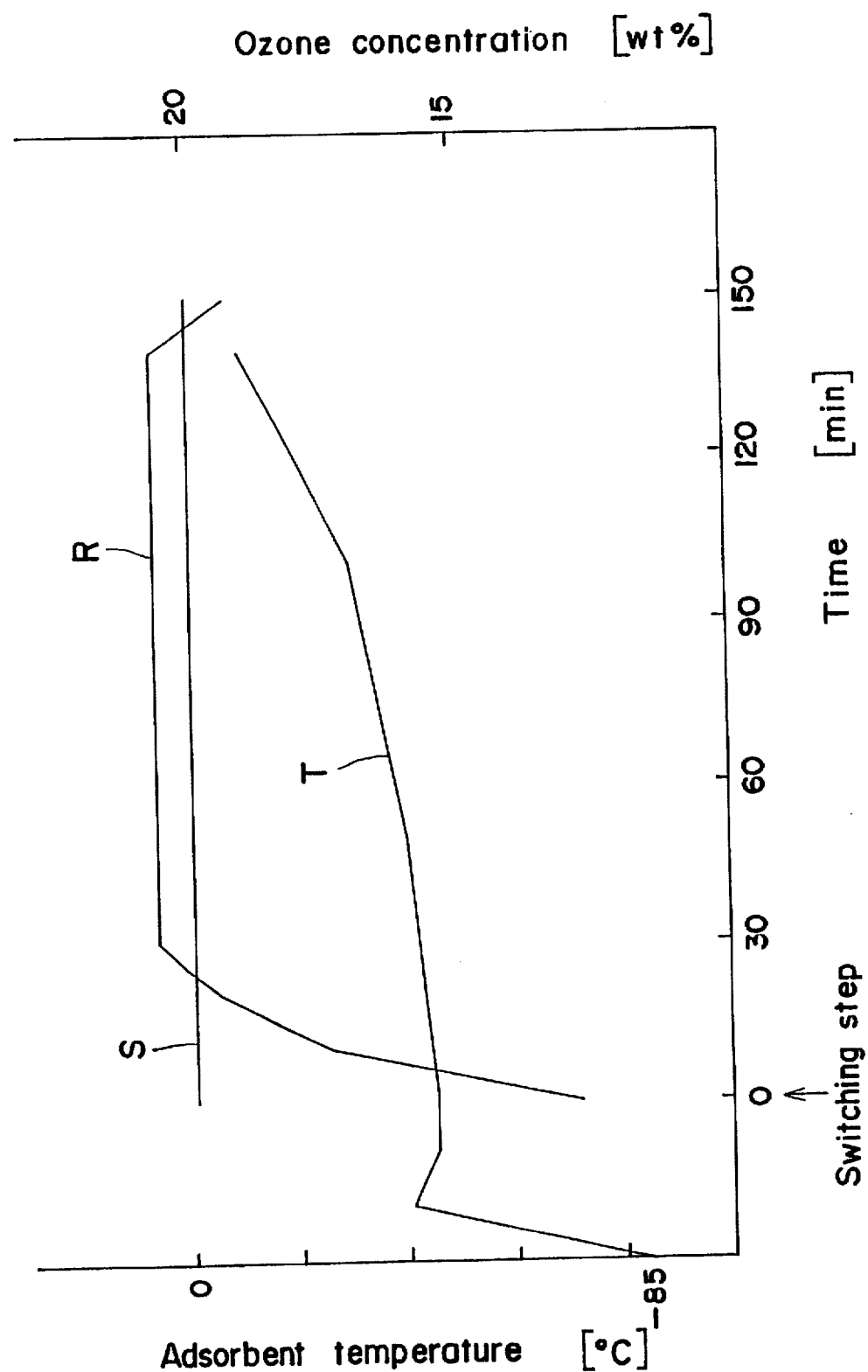

5,730,783

1

OZONE CONCENTRATING PROCESS

TECHNICAL FIELD

The present invention relates to a process for concentrating ozone.

BACKGROUND ART

Ozone is generated by an ozonizer by means of high-voltage silent discharge employing air, an oxygen-rich gas or an oxygen gas as a feedstock gas. However, the concentration of ozone generated by high-voltage silent discharge is 15 wt % or less even when an oxygen gas is employed as the feedstock gas, and it is supplied to the spot where it is consumed usually at an ozone level of 6 to 7 wt % in view of efficiency, at most about 10 wt %. Ozone is usually generated by the ozonizer at a rate of about 1 kg/cm$^2$ G. Accordingly, in the case where ozone having a pressure of about 4 to 6 kg/cm$^2$ G is required, for example, for bleaching of pulp, the thus generated ozone-containing gas is compressed to a predetermined pressure by a compressor before it is supplied to the spot.

Meanwhile, on the spot where ozone is to be consumed, higher concentration ozone is desired so as to improve efficiency of ozone treatment. For example, since ozone has a property of being adsorbed on adsorbents such as silica gel at low temperatures, there is employed a method in which the ozone is separated from oxygen by the thermal swing adsorption (hereinafter referred to as TSA) method utilizing such property to obtain ozone having a relatively high concentration.

Concentration of ozone according to the TSA method described above is generally performed employing a plurality of adsorption columns each packed with an adsorbent such as silica gel which preferentially adsorbs ozone. In this process, the plurality of adsorption columns are switched sequentially to an adsorption step where an ozone-containing gas supplied from an ozonizer is introduced to the adsorption column containing an adsorbent cooled to a low temperature, to adsorb ozone on the adsorbent; a desorption step where the adsorbent contained in the adsorption column having been subjected to the adsorption step is heated to desorb ozone therefrom, and a scavenger gas is introduced into the adsorption column from the opposite side with respect to the ozone-containing gas introducing side to discharge the desorbed ozone being carried on the scavenger gas; and a cooling step where the adsorbent in the adsorption column having been subjected to the desorption step is cooled again to the same level as in the adsorption step.

However, in the ozone concentration process according to the conventional TSA method, since the adsorption column in the desorption step is heated at a stretch like in the general TSA method, most of ozone is desorbed at the initial stage of the desorption step, and not only the ozone concentration of the gas discharged from the adsorption column in the desorption step but also flow rate of that gas fluctuate a lot, so that ozone cannot be supplied at a stable concentration unless some other means is taken. Accordingly, an extra equipment for stabilizing ozone concentration (ozone level stabilizer) must be disposed downstream the ozone concentrating apparatus.

As the ozone level stabilizer, for example, one described in Japanese Unexamined Patent Publication No. 128865/1975 has been employed. More specifically, a packed column packed with an adsorbent capable of adsorbing ozone, such as silica gel, is maintained at such a low temperature level that the adsorbent can adsorb ozone so as to maintain the concentration of ozone to be supplied substantially constant utilizing the correlation between the ozone concentration and the amount of adsorbed ozone.

However, in the case where the ozone concentration fluctuates a lot like in the conventional ozone concentration method, a packed column having a very large capacity must be employed, so that the amount of adsorbent to be charged therein, and also a large amount of refrigerant is required for maintaining the adsorbent at the low temperature.

Further, in order to compress a gas containing ozone having high oxidative power, a compressor of a special structure must be provided, and besides the temperature of the ozone-containing gas is elevated by the heat of compression generated when the gas is compressed by the compressor to partly decompose the ozone, disadvantageously. Meanwhile, when the compressor is operated, a rotor which is inevitably contained in the compressor, gives noises and makes maintenance of the compressor troublesome, disadvantageously.

Furthermore, in the ozone concentration process according to the conventional TSA method, the adsorption step is terminated before ozone flows out through the outlet of the adsorption column in the adsorption step, i.e. before breakthrough of the adsorbent, and switched to the desorption step so as to effectively utilize the ozone generated by the ozonizer. Accordingly, the adsorbent contained in each adsorption column cannot be entirely allowed to adsorb ozone fully, and even such portion of the adsorbent having no ozone adsorbed thereon are also subjected to temperature control in the desorption step and cooling step, leading to loss of energy.

DISCLOSURE OF THE INVENTION

It is a first objective of the present invention, when ozone is concentrated according to the TSA method, to stabilize the ozone concentration in the ozone-containing gas discharged from the adsorption column in the desorption step.

It is a second objective of the present invention, when ozone is concentrated according to the TSA method, to supply ozone with a desired pressure.

It is a third objective of the present invention, when ozone is concentrated according to the TSA method, to make efficient use of energy.

It is a fourth objective of the present invention, when ozone is concentrated according to the TSA method, to carry out cooling of the adsorbent effectively and to make effective use of oxygen as the raw material of ozone.

SUMMARY OF THE INVENTION

The present invention relates to a process for concentrating ozone, which comprises switching a plurality of adsorption columns each packed with an adsorbent capable of preferentially adsorbing ozone thereon sequentially to an adsorption step where the adsorbent is maintained at a low temperature to adsorb ozone thereon; a desorption step where the adsorbent is heated to desorb ozone therefrom, and a scavenger gas is introduced in a substantially fixed amount into the adsorption column to discharge the thus desorbed ozone being carried on the scavenger gas; and a cooling step where the adsorbent having completed the desorption step is cooled to the same low temperature level as in the adsorption step. According to a first aspect of the present invention, heating of the adsorbent in the desorption step is carried out under a predetermined heating condition depending on the time elapsed after desorption is started.

A second aspect of the present invention relates to the process for concentrating ozone; wherein heating of the adsorbent in the desorption step is carried out depending on the ozone concentration in the gas discharged from the adsorption column performing the desorption step. In the desorption step according to the second aspect of the invention, the adsorbent in the adsorption column in the desorption step is heated when the ozone concentration of the gas discharged from that adsorption column is a preset lower limit level or lower, while heating of the adsorbent is terminated or the adsorbent is cooled when the ozone concentration is a preset upper limit level or higher. According to the second aspect, the desorption step is terminated, when the adsorbent in the adsorption column in the desorption step is heated to the preset upper limit level and the ozone concentration of the gas discharged from that adsorption column has dropped below the lower limit level, and the adsorption column is switched to the cooling step.

According to the first and second aspects of the present invention, the amount of ozone desorbed from the adsorbent in the desorption step can be leveled. More specifically, since the ozone adsorbed on the adsorbent is desorbed successively depending on the degree of heating the adsorbent, the amount of ozone to be desorbed from the adsorbent can be adjusted by controlling heating of the adsorbent as described above, and thus not only the ozone concentration in the scavenger gas can be maintained within a predetermined range but also the flow rate thereof can be maintained substantially at a fixed value.

Therefore, when ozone is concentrated according to the TSA method, since the adsorbent is heated under a predetermined condition in the desorption step to desorb ozone therefrom, the amount of ozone desorbed from the adsorbent in the desorption step to be carried on the scavenger gas can be leveled. Thus, fluctuation in the level of concentrated ozone to be supplied to the spot where it is consumed, as well as, in the flow rate thereof can be reduced on a great margin.

A third aspect of the present invention relates to the process for concentrating ozone, in which ozone desorbed from the adsorbent is discharged being carried on a gas having a predetermined pressure employed as the scavenger gas in the desorption step. Further, discharging of ozone from the adsorption column according to the third aspect is carried out after the internal pressure of the adsorption column reached a predetermined level.

According to the third aspect of the invention, since the ozone desorbed from the adsorbent in the desorption step is supplied being carried on the scavenger gas having a predetermined pressure to the spot where it is consumed, an ozone-containing gas with a predetermine pressure can be obtained by setting the pressure of the scavenger gas to the level required in that spot. Thus, the ozone-containing gas need not be compressed by a compressor, so that decomposition of ozone to be caused by the heat of compression can be avoided.

Meanwhile, if a gas charged in a high-pressure gas container or a high-pressure gas from a high-pressure gas generating equipment or from a high-pressure gas consuming equipment installed separately is introduced through a piping and is used as the scavenger gas, the compressor need not be incorporated into the ozone supplying apparatus. Further, the ozone concentration can be increased by suitably setting the amount of scavenger gas relative to the amount of ozone adsorbed on the adsorbent.

Therefore, according to the third aspect of the invention, since ozone is adsorbed on the adsorbent employing the TSA method to obtain an ozone-containing gas with a desired pressure employing a predetermined pressure of scavenger gas in the desorption step, there is no need of employing a compressor for increasing the pressure of the ozone-containing gas, and an ozone-containing gas with the desired pressure can be obtained easily. Further, since decomposition of ozone by the heat of compression does not occur, ozone utilization efficiency can also be improved. In addition, concentration of ozone can be achieved by adjusting the amount of scavenger gas.

A fourth aspect of the present invention relates to the process for concentrating ozone, in which the adsorption step includes a pre-adsorption sub-step and a main adsorption sub-step; the cooling step is followed by the pre-adsorption sub-step; the pre-adsorption sub-step is followed by the main adsorption sub-step; and the main adsorption sub-step is followed by the desorption step; the pre-adsorption sub-step being carried out by introducing an outlet gas from the adsorption column performing the main adsorption step.

According to the fourth aspect of the invention, even if the adsorption column in the main adsorption sub-step is saturated with ozone to let ozone flow out through its outlet, such ozone can be adsorbed on the adsorbent in the adsorption column in the pre-adsorption sub-step, connected downstream serially to the adsorption column in the main adsorption sub-step, so that the main adsorption sub-step can be continued until the entire adsorbent in the adsorption column adsorbs ozone fully thereon. Thus, cooling and heating of the adsorbent in each adsorption column is performed with respect to the entire amount of adsorbent having adsorbed ozone fully thereon, causing no loss of energy. Further, since the adsorbent can be utilized effectively, a smaller amount of adsorbent may be employed for treating substantially the same amount of ozone as can be treated according to the prior art method, leading to downsizing of the adsorption columns, in turn, of the entire equipment.

Therefore, according to the fourth aspect of the invention, since the adsorption step is designed to be carried out in two adsorption columns connected serially to each other, the adsorbent in the upstream adsorption column in the main adsorption sub-step can be allowed to adsorb ozone fully thereon, to leave substantially no adsorbent which does not participate in ozone adsorption and desorption. This leads to effective utilization of the energy for cooling and heating the adsorbent as well as to reduction in the production cost on a great margin.

A fifth aspect of the present invention relates to the process for concentrating ozone, in which a low-temperature oxygen from a low-temperature oxygen supply source is employed as a cooling source in the cooling step; the low-temperature oxygen used as the cooling source is then supplied as a raw material of ozone to an ozonizer; and an ozone-containing gas generated by the ozonizer is introduced to the adsorption column performing the adsorption step.

According to the fifth aspect of the invention, by using the low-temperature oxygen from the low-temperature oxygen supply source, e.g., liquid oxygen, as the source for cooling the adsorbent, no other cooling source is required or, if employed, the amount of such cooling source can be reduced. The oxygen having served as the cooling source is effectively utilized as the raw material of ozone, or the oxygen may be recovered for circulation.

Therefore, according to the fifth aspect of the invention, since liquid oxygen is used as the source for cooling the adsorbent and oxygen gas formed by evaporation of the liquid oxygen is used as the raw material of ozone, the running cost can be reduced over the case where another gas is employed as the cooling source. In addition, when the oxygen gas is recovered for circulation, no substantial concentration of impurities occur.

Highly concentrated ozone obtained according to any of the foregoing aspects of the present invention can be used in facilities where relatively high-concentration of ozone is consumed such as for bleaching pulp, water treatment, etc.

BRIEF DESCRIPTION OF THE DRAWINGS

FIGS. 3(a)–3(d) are explanatory drawings showing ozone adsorption states according to a fourth embodiment of the present invention;

FIGS. 4(a)–4(c) are explanatory drawings showing ozone adsorption states according to the prior art method;

FIG. 5 is a graph showing changes in the adsorbent heating temperature, in the ozone concentration at the outlet of the adsorption column and in the ozone concentration at the outlet of an ozone level stabilizer.

BEST MODES FOR EMBODYING THE INVENTION

The present invention will be described more specifically referring to the attached drawings.

Figure 1:
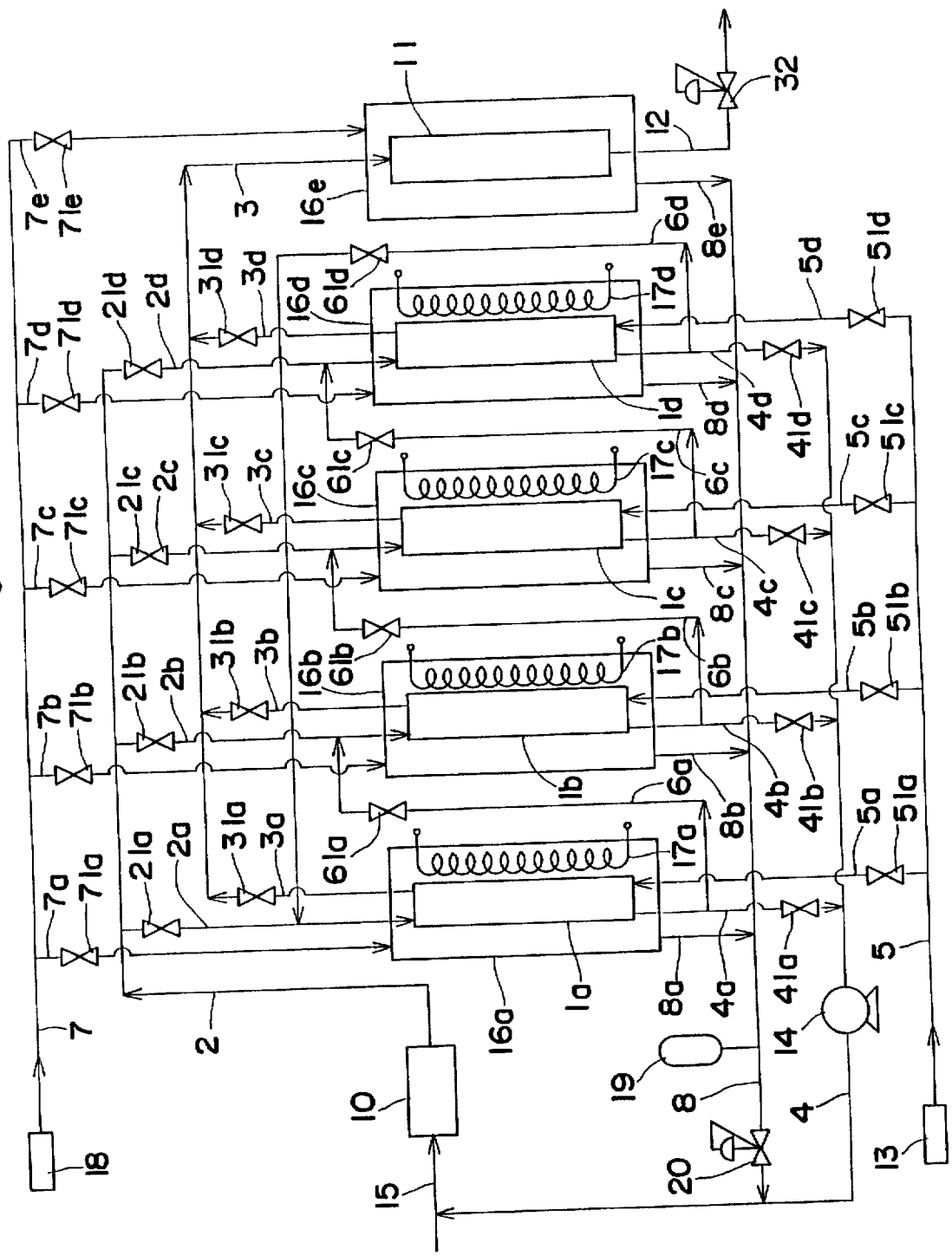
FIG. 1 is a schematic diagram showing constitution of an exemplary ozone concentrating and supplying apparatus employing the TSA mode for embodying the process of the present invention.

FIG. 1 shows an example of ozone concentrating and supplying apparatus employing the TSA mode for embodying the ozone concentrating process according to the present invention.

This ozone concentrating and supplying apparatus is provided with four adsorption columns $1a,1b,1c,1d$ each packed with an adsorbent which adsorbs ozone preferentially, for example, silica gel. Inlet passages $2a,2b,2c,2d$ branched from a passage 2 connected to an ozonizer 10 and concentrated ozone discharge passages $3a,3b,3c,3d$ connected to a concentrated ozone combining discharge passage 3 are connected to the inlet sides (the upper sides in FIG. 1) of the adsorption columns $1a,1b,1c,1d$, respectively. The inlet passages $2a,2b,2c,2d$ are provided with closing valves $21a,21b,21c,21d$ for switching the steps in the adsorption columns $1a,1b,1c,1d$, respectively. Likewise, the concentrated ozone discharge passages $3a,3b,3c,3d$ are provided with step-switching closing valves $31a,31b,31c,31d$, respectively. The concentrated ozone combining discharge passage 3 is connected to a stabilizer 11 for stabilizing the level of concentrated ozone to be supplied to the spot where it is to be consumed. To the ozone level stabilizer 11 is connected a concentrated ozone supply passage 12 for supplying the concentrated ozone to the spot. The concentrated ozone supply passage 12 is provided with a pressure control valve 32 for maintaining the pressure of the concentrated ozone to be supplied to the spot at a fixed level.

Outlet passages $4a,4b,4c,4d$ for recovering the gas which failed to be adsorbed in the adsorption columns $1a,1b,1c,1d$ and scavenger gas introducing passages $5a,5b,5c,5d$ branching out of a passage 5 connected to a scavenger gas supply source 13 are connected to the outlet sides of the adsorption columns $1a,1b,1c,1d$, respectively. The outlet passages $4a,4b,4c,4d$ are provided with step-switching closing valves $41a,41b,41c,41d$, respectively, and these outlet passages $4a,4b,4c,4d$ are connected to an outlet gas combining passage 4. An air blower 14 is disposed on the outlet gas combining passage 4 which is connected to a feedstock supply passage 15 for supplying an oxygen gas as a raw material of ozone to the ozonizer 10. The scavenger gas introducing passages $5a,5b,5c,5d$ are provided with step-switching closing valves $51a,51b,51c,51d$, respectively.

An adsorption column connecting passage $6a$, which is branched out of the outlet passage $4a$ upstream the closing valve $41a$, is connected to the inlet passage $2b$ downstream the closing valve $21b$. An adsorption column connecting passage $6b$, which is branched out of the outlet passage $4b$ upstream the closing valve $41b$, is connected to the inlet passage $2c$ downstream the closing valve $21c$. An adsorption column connecting passage $6c$, which is branched out of the outlet passage $4c$ upstream the closing valve $41c$, is connected to the inlet passage $2d$ downstream the closing valve $21d$. An adsorption column connecting passage $6d$, which is branched out of the outlet passage $4d$ upstream the closing valve $41d$, is connected to the inlet passage $2a$ downstream the closing valve $21a$. The adsorption column connecting passages $6a,6b,6c,6d$ are provided with step-switching closing valves $61a,61b,61c,61d$, respectively.

The adsorption columns $1a,1b,1c,1d$ are surrounded by cooling jackets $16a,16b,16c,16d$ for cooling and heating the adsorbent, respectively, and these jackets $16a,16b,16c,16d$ contain heaters $17a,17b,17c,17d$, respectively. The ozone level stabilizer 11 is surrounded by a cooling jacket $16e$ for maintaining a packing contained therein at a predetermined low temperature.

Liquid oxygen introducing passages $7a,7b,7c,7d,7e$ branching out of a passage 7 connected to a low-temperature oxygen supply source 18 and oxygen gas discharge passages $8a,8b,8c,8d,8e$ which are combined into a passage 8 are connected to the cooling jackets $16a,16b,16c,16d,16e$, respectively. The liquid oxygen introducing passages $7a,7b,7c,7d,7e$ are provided with closing valves $71a,71b,71c,71d,71e$, respectively. The passage 8, which is provided with a gas holder 19 and a pressure control valve 20 for maintaining the pressure of the oxygen gas at a constant level, is connected to the feedstock supply passage 15 via the outlet gas combining passage 4.

The thus constituted ozone concentrating and supplying apparatus is operated by opening and closing the closing valves in predetermined orders and by cooling and heating the adsorption columns to switch the adsorption columns $1a,1b,1c,1d$ sequentially to an adsorption step A where an ozone-containing gas supplied from the ozonizer 10 is introduced to the adsorption column, the adsorbent contained therein is cooled to a low temperature, to adsorb ozone thereon; a desorption step B where the adsorbent contained in the adsorption column having completed the adsorption step A is heated to desorb ozone therefrom, and a predetermined amount of scavenger gas is introduced into the adsorption column to discharge the desorbed ozone being carried on the scavenger gas; and a cooling step C where the adsorbent in the adsorption column having completed the desorption step B is cooled again to the same level as in the adsorption step, to obtain ozone concentrated to a predetermined level, which is supplied to the spot where it is consumed.

In this example, the adsorption step A is divided into a main adsorption sub-step A1 and a pre-adsorption sub-step A2.

Next, procedures of concentrating ozone to a predetermined level and supplying the thus concentrated ozone to the spot where it is consumed will be described. It should be noted here that at the initial stage, the adsorption columns 1a,1b,1c,1d are in the main adsorption sub-step A1, the preadsorption sub-step A2, the cooling step C and the desorption step B, respectively.

With respect to the adsorption column 1a in the main adsorption sub-step A1, the closing valves 21a,61a,71a are opened, and the closing valves 31a,41a,51a,61d are closed. The ozone-containing gas from the ozonizer 10 is fed through the passage 2 and inlet passage 2a and introduced into the adsorption column 1a, where ozone is adsorbed on the adsorbent contained therein. The gas which failed to be adsorbed on the adsorbent in the adsorption column 1a is fed through the adsorption column connecting passage 6a and introduced into the adsorption column 1b in the pre-adsorption sub-step A2.

A liquid oxygen, which is fed as a cooling source from the low-temperature oxygen supply source 18, is introduced through the passage 7 and liquid oxygen introducing passage 7a into the cooling jacket 16a to cool the adsorbent in the adsorption column 1a to a predetermined temperature. An oxygen gas formed when the adsorbent in the adsorption column 1a was cooled is fed through the oxygen gas discharge passage 8a, passage 8, outlet gas combining passage 4 and feedstock supply passage 15 into the ozonizer 10 as a raw material of ozone.

The oxygen gas fed as the raw material of ozone to the ozonizer 10 is partly ozonized by high-voltage silent discharge in the ozonizer 10 to be converted to an ozone-containing gas. While the ozone concentration of this ozone-containing gas is not particularly limited, it is suitably 6 to 7 wt % in view of efficiency of the ozonizer 10. Meanwhile, the cooling temperature of the adsorbent in the adsorption column 1a is not critical, and it is maintained, for example, at −80° C.

With respect to the adsorption column 1b in the pre-adsorption sub-step A2, the closing valves 41b,71b are opened, and the closing valves 21b,31b,51b,61b are closed. The gas in the adsorption column 1a is introduced through the adsorption column connecting passage 6a into the adsorption column 1b, and the residual ozone in that gas is adsorbed on the adsorbent contained in the adsorption column 1b. The gas which failed to be adsorbed on the adsorbent in the adsorption column 1b is fed through the outlet passage 4b and outlet gas combining passage 4 to be sucked into the air blower 14, where it is compressed to the same pressure level as that of the oxygen gas in the feedstock supply passage 15, and then combined with the oxygen gas in the feedstock supply passage 15. The thus combined gas is circulated to the ozonizer 10.

In this process, the liquid oxygen is introduced from the low-temperature oxygen supply source 18 through the passage 7 and liquid oxygen introducing passage 7b into the cooling jacket 16b and then discharged through the oxygen gas discharge passage 8b.

With respect to the adsorption column 1c in the cooling step C, the closing valve 71c is opened and the closing valves 21c,31c,41c,51c,61c are closed. The liquid oxygen is introduced from the low-temperature oxygen supply source 18 through the passage 7 and liquid oxygen introducing passage 7c into the cooling jacket 16c and then discharged through the oxygen gas discharge passage 8c to cool the adsorbent in the adsorption column 1c.

With respect to the adsorption column 1d in the desorption step B, the closing valves 31d, 51d are opened and the closing valves 21d,41d,61d,71d are closed. The adsorption column 1d is heated to a predetermined temperature by the heater 17d. The ozone desorbed by this heating from the adsorbent contained in the adsorption column 1d is discharged into the concentrated ozone discharge passage 3d being carried by a predetermined amount of scavenger gas introduced from the scavenger gas supply source 13 through the passage 5 and scavenger gas introducing passage 5d into the adsorption column 1d. The concentrated ozone discharged into the concentrated ozone discharge passage 3d is fed through the concentrated ozone combining passage 3 into the ozone level stabilizer 11.

The concentrated ozone introduced into the ozone level stabilizer 11 is further stabilized in the ozone concentration under the action of the packing cooled by the liquid oxygen introduced from the low-temperature oxygen supply source 18 through the passage 7 and liquid oxygen introducing passage 7e into the cooling jacket 16e of the stabilizer 11 and then supplied, while its pressure is maintained at a fixed level by the pressure control valve 32, through the concentrated ozone supply passage 12 to the spot where it is consumed.

After passage of a predetermined time, the closing valves are opened and closed in the predetermined orders respectively to switch the adsorption column 1a from the main adsorption sub-step A1 to the desorption step B; the adsorption column 1b, from the pre-adsorption sub-step A2 to the main adsorption sub-step A1; the adsorption column 1c, from the cooling step C to the pre-adsorption sub-step A2; and the adsorption column 1d, from the desorption step B to the cooling step C, respectively. By repeating switching of the adsorption columns sequentially in the order of main adsorption sub-step A1, desorption step B, cooling step C and pre-adsorption sub-step A2, concentrated ozone is discharged successively from each adsorption column in the desorption step B.

Incidentally, the amount of adsorbent, ozone concentration or flow rate of the ozone-containing gas, the cooling and heating energy, etc. are set such that switching of the steps can be carried out in the state where the adsorbent in the adsorption column in the main adsorption sub-step A1 is substantially saturated, where no ozone is flowing out through the outlet of the adsorption column in the pre-adsorption sub-step A2, where cooling of the adsorption column in the cooling step C is completed and where the substantial amount of ozone is desorbed from the adsorbent in the adsorption column in the desorption step B.

A first embodiment of the present invention will now be described. According to the first embodiment of the present invention, when concentrated ozone is to be generated as described above, the heating condition for the adsorbent in the desorption step B is suitably controlled so as to maintain the level of the concentrated ozone discharged from the adsorption column and flow rate thereof substantially within predetermined ranges, respectively.

Figure 2:
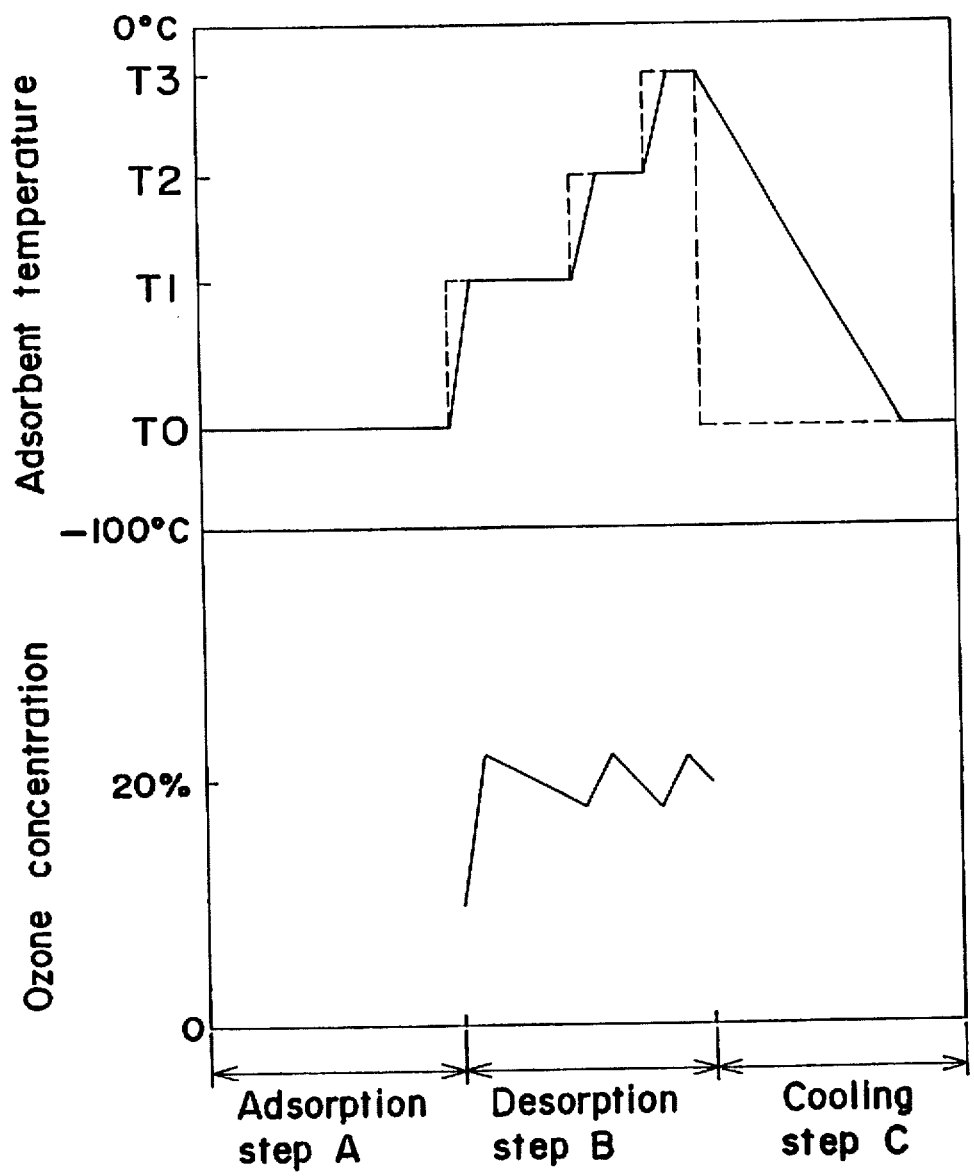
FIG. 2 is a drawing for explaining the relationship between adsorbent temperature and ozone concentration according to a first embodiment of the present invention.

FIG. 2 is a drawing showing temperature of the adsorbent in each step and change in the ozone concentration in the desorption step. The upper half of the chart shows the real temperature (solid line) versus the preset temperatures (broken line) to which the adsorbent is to be cooled and heated; whereas the lower half of the chart shows the concentration of ozone in the ozone discharge passage connected to the adsorption column.

Referring first to the preset temperatures, the temperature in the adsorption step A and in the cooling step C is set at the adsorption facilitating temperature T0, for example, at −80°

C.; whereas the heating is designed to be carried out stepwise at three preset temperature levels in the desorption step B. More specifically, when the desorption step B sets in after completion of the adsorption step A, heating is started at a first-preset temperature T1 (lowest), followed by heating at a second preset temperature T2 and at a third preset temperature T3, each for a predetermined heating time.

The temperature of the adsorbent is increased with a predetermined gradient as indicated by the solid line relative to the preset temperature levels T1,T2,T3 indicated by the broken lines, and ozone is desorbed successively as the temperature of the adsorbent is increased. By discharging from the adsorption column the ozone desorbed from the adsorbent being carried on a scavenger gas fed at a substantially fixed flow rate, the ozone concentration can be maintained within the range as shown in the lower half of the chart shown in FIG. 2, for example, 20 ±several wt %.

These preset temperature levels T1,T2,T3 are suitably selected depending on the concentration of ozone to be supplied, constitution of the equipment, step-switching time, etc., and the number of steps in the stepwise heating and the temperature difference between these steps can be arbitrarily selected. It is also possible to set such that the heating may be performed stepless to the final heating temperature.

Incidentally, the mode of temperature control is not particularly limited, and for example, the voltage to be applied to the heater may be preset for each stage to increase the voltage successively with time. Alternatively, the temperature of the adsorbent, the internal temperature of the cooling jacket or the temperature of the gas in the ozone discharge passage may be detected to control the capacity of the heater based on the detected temperature value and the time elapsed. Further, the temperature of the adsorbent can be increased continuously according to a heating curve preset based on the data obtained by continuously changing the voltage applied to the heater.

The closing valves $51a,51b,51c,51d$ of the scavenger gas introducing passages and the closing valves $31a,31b,31c,31d$ of the concentrated ozone discharge passages may be opened soon after the corresponding adsorption column is switched to the desorption step or after the adsorbent is heated to some degree and to start ozone desorption.

As a variation of the first embodiment, the concentrated ozone combining discharge passage 3 may be provided with an ozone concentration meter so that the preset temperature may be shifted up to the next step depending on the ozone concentration. For example, in the case where the target ozone concentration value is preset to 20 wt %, the preset temperature may be designed to be shifted up by one step when the ozone concentration measured by the ozone concentration meter has dropped to 15 wt %.

As a modification of this variation of the first embodiment, the heating temperature may not be preset, but the capacity of the heater may be adapted to be controlled depending on the concentration of ozone in the concentrated ozone combining passage 3. For example, when the target ozone concentration value is 20 wt %, an upper limit ozone concentration value and a lower limit ozone concentration value are preset to 23 wt % and 17 wt % respectively, and the heater is actuated as soon as the desorption step B is started to heat the adsorbent and desorb ozone therefrom, whereas the heater is deactuated when the ozone concentration of the discharge gas has reached 23 wt %. The heater is actuated again when the ozone concentration has dropped to 17 wt %. Further, a refrigerant may be introduced into the cooling jacket to cool the adsorbent when the ozone concentration has exceeded the upper limit value (23 wt %).

As described above, the amount of ozone to be desorbed from the adsorbent can be leveled by heating the adsorbent under a predetermined condition in the desorption step B. Thus, fluctuation in the level of the concentrated ozone to be supplied to the spot where it is consumed and in the flow rate thereof can be reduced on a great margin.

Further, in the desorption step B, desorption of ozone from the adsorbent is assumed to have been completed at the moment where the temperature of the adsorbent reaches the preset upper limit value and the ozone concentration of the gas discharged from the adsorption column has dropped below the lower limit value, and the desorption step B is terminated and is switched to the cooling step C. Thus, a low ozone concentration gas is prevented from flowing into the concentrated ozone combining passage 3.

Fluctuation in the level of concentrated ozone can be reduced further by incorporating the ozone level stabilizer 11 into the concentrated ozone combining discharge passage 3. Since the fluctuation in the level of the concentrated ozone flowing into this stabilizer 11 is small compared with that in the prior art method, the stabilizer may be of smaller capacity than the one required in the prior art method, thus contributing to reduction in the amount of adsorbent employed, the amount of refrigerant for cooling the adsorbent, etc.

Next, a second embodiment of the present invention will be described.

According to the second embodiment of the invention, when concentrated ozone is generated according to the process described above, a gas of a predetermined pressure fed from the scavenger gas supply source 13 is used as the scavenger gas for discharging the ozone desorbed from the adsorbent in the desorption step B so as to increase the pressure of the concentrated ozone to be supplied to the spot where it is consumed.

In this embodiment, since the pressure in the concentrated ozone combining discharge passage 3 and the pressure in the ozone level stabilizer 11 are increased, it is preferred to dispose a check valve in the concentrated ozone combining discharge passage 3 or to replace the closing valves $31a$, $31b,31c,31d$ with check valves.

As a variation of the second embodiment, ozone may be discharged from the adsorption columns after the adsorption columns assumed a predetermined pressure level.

In this case, the closing valves $51a,51b,51c,51d$ are opened, and after the internal pressure of the adsorption columns was increased above the internal pressure of the concentrated ozone combining discharge passage 3, the closing valves $31a,31b,31c,31d$ are opened to start discharging of the concentrated ozone from the adsorption columns.

As described above, since concentrated ozone having a desired pressure can be obtained, without employing an ozone compressor, by employing a gas with a predetermined pressure as the scavenger gas to carry ozone thereby, decomposition of ozone by the heat of compression can be avoided, enabling effective use of the ozone generated by the ozonizer 10.

The level of the concentrated ozone to be supplied to the spot where it is consumed can be set arbitrarily depending on the amount of adsorbed ozone in the adsorption step and on the amount of scavenger gas to be fed relative to the time of the desorption step. For example, an ozone-containing gas having a pressure of 4 to 6 $kg/cm^2$ G and a concentration of about 20 wt %, which is suitably employed for pulp bleaching, can be easily obtained.

The scavenger gas supply source 13 in the second embodiment supplies an oxygen gas, a nitrogen gas, air, etc.

having a predetermined pressure as the scavenger gas to the adsorption column in the desorption step. The scavenger gas supply source 13 for supplying a high-pressure gas which is employable here includes various kinds of equipments, and for example, a gas compressor can be employed as one having the simplest constitution. However, there is no need of incorporating such gas compressor into the ozone concentrating and supplying apparatus if a high-pressure gas charged in a container or a high-pressure gas in a high-pressure gas generating equipment or a high-pressure gas consuming equipment, installed as a separate unit, is introduced through a pipe and utilized, and thus reliability of the ozone concentrating and supplying apparatus can be improved to facilitate maintenance thereof and to reduce noises remarkably.

Incidentally, since the internal pressure of the adsorption column when it is switched from the desorption step to the cooling step is increased to the pressure level of the scavenger gas, it should be lowered to the adsorption pressure during the cooling step, and the internal pressure can be easily released through an exhaust valve disposed to each adsorption column or to the passage connected thereto. When an oxygen gas having a relatively high purity is employed here as the high-pressure scavenger gas, pressure control valves may be disposed to the outlet passages 4a,4b,4c,4d respectively to release the oxygen gas in the adsorption column in the cooling step therethrough to reduce the pressure to the adsorption pressure level and to recover the thus released oxygen gas into the outlet gas combining passage 4, which can be employed as a part of the raw material of ozone.

Next, a third embodiment of the present invention will be described.

According to the third embodiment of the invention, when concentrated ozone is generated according to the process described above, the adsorption step A is divided into the main adsorption sub-step A1 and pre-adsorption sub-step A2 so as to make effective use of the adsorbent packed in each adsorption column.

More specifically, as shown in FIG. 3(a), when the adsorption column 1a and the adsorption column 1b are switched to the main adsorption sub-step 1A and the pre-adsorption sub-step 1B respectively, there is an ozone level gradient (adsorption front line) as indicated by the hatching F from the inlet side toward the outlet side in the adsorption column 1a having completed the pre-adsorption sub-step A2 in the previous step, and the ozone level gradient gradually moves toward the outlet side of the adsorption column 1b in the pre-adsorption sub-step A2 as the ozone-containing gas is supplied through the inlet passage 2a into the adsorption column 1a. When substantially the entire amount of adsorbent in the adsorption column 1a has fully adsorbed ozone as shown in FIG. 3(b), the point of the ozone level gradient reaches the outlet of the adsorption column 1b by suitably setting the length of the adsorption columns and superficial velocity.

In the state shown in FIG. 3(b), the adsorption column 1b is switched to the main adsorption sub-step A1, and the adsorption column 1c having completed the cooling step C is switched to the pre-adsorption sub-step A2, as shown in FIG. 3(c) to carry out adsorption procedures, respectively. Simultaneously, the adsorption column 1a having completed the main adsorption sub-step A1 is also switched to the desorption step B. Thus, at the end of this step, substantially the entire amount of adsorbent in the adsorption column 1b has fully adsorbed ozone, as shown in FIG. 3(d), and the adsorption column 1b is then switched to the desorption step B.

Accordingly, since the desorption step B is started in the state where the substantially all of the adsorbent in the corresponding adsorption column has fully adsorbed ozone thereon (saturated state), the adsorbent packed in the adsorption column can be effectively utilized. Further, cooling of the adsorbent from the cooling step C until the end of the main adsorption sub-step A1, as well as, heating of the adsorbent in the desorption step B are carried out against the entire amount of adsorbent which actually participates in adsorption and desorption of ozone, respectively, the cooling energy and heating energy can be effectively utilized.

Meanwhile, in the ozone concentration process according to the conventional TSA method, adsorption and desorption have been carried out in the states as shown in FIG. 4. More specifically, according to the conventional method, the ozone level gradient indicated by the hatching F moves from the state shown in FIG. 4(a) to the state shown in FIG. 4(b) as the adsorption step A proceeds in an adsorption column P, and the adsorption step A is terminated before ozone flows out through the outlet of the adsorption column and is switched to the desorption step B. A scavenger gas is then introduced from the outlet side of the adsorption column P, and the desorption step B is terminated when the ozone level gradient indicated by the hatching F assumes the state shown in FIG. 4(c).

As described above, according to the conventional method, the adsorption step A is terminated before ozone flows out through the outlet of the adsorption column in the adsorption step A so as to make effective use of the ozone generated by the ozonizer, and the desorption step B is terminated before the amount of ozone to be desorbed from the adsorbent decreases so that the ozone level of the concentrated ozone may not be lowered.

Accordingly, since the adsorption step A is terminated in the state where some portion of the adsorbent has not absorbed ozone thereon, as shown in FIG. 4(b), and the desorption step B is terminated in the state where some portion of the adsorbent has not desorbed ozone therefrom, as shown in FIG. 4(c), even such portion of the adsorbent which does not participate in ozone adsorption must be subjected to cooling, and even such portion of the adsorbent which does not participate in ozone desorption must be subjected to heating. Therefore, such portions of the adsorbent which do not participate in adsorption or desorption of ozone are subjected to temperature control, leading to loss of energy.

Further, in the adsorption procedures in the third embodiment of the invention, since the adsorption column in the main adsorption sub-step A1 and the adsorption column in the pre-adsorption sub-step A2 are serially connected to each other, the total length of the column participating in adsorption (height of the packed adsorbent bed) is substantially doubled, so that the adsorption columns may be substantially ½ as long as the conventional adsorption columns to treat the same amount of ozone. Further, in the third embodiment, four adsorption columns are desirably employed. In the case where four adsorption columns are employed, although the number of adsorption columns increases compared with the conventional method employing three adsorption columns, the entire size of these four adsorption columns can be reduced to about ⅔, and thus the energy required for the heating procedure in the desorption step B and for the cooling procedure in the cooling step C can be reduced to about ⅔.

Particularly, the TSA method requires much time for the cooling and heating procedures in the adsorption and desorption steps respectively compared with the pressure swing separative adsorption (PSA) in which switching to the adsorption procedures or desorption procedures can be performed in a short time: in the PSA method, switching from the adsorption procedures to the desorption procedures or vice versa takes about several seconds to several tens of seconds, whereas it takes about several tens of minutes in the TSA method. Accordingly, the downsizing of the adsorption columns contributes to reduction of time and energy required for cooling and heating, as well as, to reduction in the power required for operating the equipment on a great margin.

Next, a fourth embodiment of the present invention will be described.

According to the fourth embodiment of the invention, when concentrated ozone is generated according to the process described above, cooling of the adsorption columns in the adsorption step A and in the cooling step C, as well as, cooling of the ozone level stabilizer 11 provided, as necessary, are carried out employing a liquid oxygen or a low-temperature oxygen gas supplied from the low-temperature oxygen supply source 18, whereas oxygen gas formed by evaporation of the liquid oxygen and the like employed as the cooling source for the adsorption columns and for the ozone level stabilizer 11 is utilized, together with the oxygen gas formed by evaporation when the adsorption column in the desorption step B is heated, as the ozone-forming raw material. Accordingly, the equipment can be operated requiring no extra cooling source such as liquid nitrogen. Further, since liquid oxygen has high oxygen purity, there is no liability of concentration of impurities which is likely to occur when air, an oxygen-rich gas or an oxygen gas recovered from oxygen PSA is utilized.

Further, the foregoing embodiments may be suitably combined.

Incidentally, as the cooling source employed for cooling the adsorbent in the first to third embodiments, there may be employed, for example, a low-temperature liquefied gas such as liquid nitrogen and liquid air, or a low-temperature refrigerant formed in a refrigerator, etc. In the fourth embodiment, such low-temperature refrigerant may be employed supplementarily. In each of the foregoing embodiments, there may be employed, in place of the heaters, a method of introducing a fluid having a predetermined temperature into the cooling jackets.

Meanwhile, as the raw gas of ozone to be supplied to the ozonizer 10, gases other than oxygen gas, for example, air and an oxygen-rich gas may be employed. In this case, if the outlet gas from the adsorption column is recovered through the outlet gas combining passage 4, components other than oxygen are concentrated to be contained in the recovery gas. Therefore, it is not preferred to connect the outlet gas combining passage 4 to the feedstock supply passage 15, so that some other means for preventing such concentration of other components should be taken.

The level of the concentrated ozone to be supplied to the spot where it is consumed can be set arbitrarily depending on the amount of adsorbed ozone in the adsorption step A and the amount of scavenger gas fed relative to the treatment time in the desorption step. Meanwhile, the kind of scavenger gas can be arbitrarily selected so long as it is not reactive with ozone, and for example, an oxygen gas, a nitrogen gas or a dry air can be employed. Further, the degree to which the adsorbent is cooled or heated can be set suitably depending on the kind of adsorbent and modes employed for cooling and heating. It should be appreciated that the number of adsorption columns to be installed is not limited to four in the present invention, but the present invention can be embodied successfully employing two adsorption columns or three or more adsorption columns.

Next, Examples of the process of the present invention will be described.

EXAMPLE 1

An equipment containing four adsorption columns each having an inner diameter of 84 mm and a total length of 500 mm and another column of the same size used as the ozone level stabilizer was employed.

The equipment was operated under the following conditions:

Adsorbent cooling temperature in adsorption step: $-85°$ C.

Step switching time: 150 minutes

Amount of feedstock gas (oxygen): 25.2 lit/h

Pressure of feedstock gas: 1.0 $kg/cm^2$ G

Amount of oxygen circulated to outlet gas combining passage: 394.8 lit/h

Amount of scavenger oxygen: 100.8 lit/h

Concentration of ozone generated by ozonizer: 6.0 wt %

Concentration of ozone supplied to the spot: 20.0 wt %

Pressure of ozone supplied to the spot: 3.0 $kg/cm^2$ G

Amount of ozone generated: 36 g/h

The adsorbent in the desorption step was heated as indicated by the curve T in FIG. 5.

As a result, although the ozone concentration at the outlet of the desorption column changed as indicated by the curve R in FIG. 5, the ozone concentration at the outlet of the ozone level stabilizer remained at 20.0 wt % as indicated by the curve S in FIG. 5 which corresponds to the preset value.

EXAMPLE 2

The procedures of Example 1 were repeated analogously except that heating of the adsorbent in the desorption step was carried out stepwise (three steps) as follows: at $-60°$ C. (T1) for the first 60 minutes after the step switching, at $-45°$ C. (T2) for the next 45 minutes and at $-25°$ C. (T3) for the last 45 minutes.

As a result, the concentration of ozone discharged from the adsorption column in the desorption step was within the range of 20±5 wt % from the initial stage through the final stage of the adsorption step. Further, the concentration of ozone supplied to the spot through the ozone level stabilizer was 20±1 wt %.

Meanwhile, in the case where the adsorption column switched to the desorption step was heated at a stretch to the temperature T3, the ozone concentration amounted to 30 wt % at the maximum and dropped to 5 wt % immediately before completion of the desorption step.

EXAMPLE 3

Heat balance data calculated when liquid oxygen was used as a cooling source for cooling the adsorbent in the fourth embodiment, provided that the amount of ozone to be supplied to the spot is 1 kg and the temperature fluctuation range is 5° C., are as shown below.

Numerical values based on which calculations were made are as follows. Incidentally, silica gel was employed as the adsorbent, and the adsorption columns made of stainless steel (SUS304) were used.

Liquid oxygen:
amount used: 1 kg
temperature: −183° C.
heat of evaporation: 50.9 kcal/kg
Adsorbent:
necessary amount: 12.5 kg
specific heat: 0.22 kcal/kg°C.
Adsorption column:
weight: 10 kg
specific heat: 0.12 kcal/kg°C.
Ozone:
heat of adsorption: 20.8 kcal/kg The adsorption columns and the adsorbent should be cooled to allow the adsorbent to adsorb ozone thereon so as to deprive the adsorbent of the heat of ozone adsorption. Therefore:

12.5 kg×0.22 kcal/kg°C.×5° C.=13.75 kcal (for cooling the adsorbent)

10 kg×0.12 kcal/kg°C.×5° C.=6 kcal (for cooling the adsorption column)

1 kg×20.8 kcal/kg=20.8 kcal (for absorbing the heat of ozone adsorption)

Accordingly, while a total cooling energy of 40.55 kcal/kg becomes necessary, the heat of evaporation deprived of by 1 kg of liquid oxygen is 50.9 kcal/kg, so that the liquid oxygen can fully cover cooling required for the operation of the equipment. Further, in the case where the temperature fluctuation range is set wider, the liquid oxygen may provide insufficient cooling calorific value, so that another cooling source must be employed. However, the amount of such additional cooling source to be employed can be reduced on a great margin.

What is claimed is:

1. A process for concentrating ozone, which comprises switching a plurality of adsorption columns each packed with an adsorbent capable of preferentially adsorbing ozone thereon sequentially to:

an adsorption step where said adsorbent is maintained at a low temperature to adsorb ozone thereon;

a desorption step where said adsorbent is heated to desorb ozone therefrom, and a scavenger gas is introduced in a substantially fixed amount into said adsorption column to discharge the thus desorbed ozone being carried on said scavenger gas; and a cooling step where said adsorbent having completed said desorption step is cooled to said low temperature as in said adsorption step;

wherein heating of said adsorbent in said desorption step is carried out under a predetermined heating condition depending on the time elapsed after desorption was started.

2. A process for concentrating ozone, which comprises switching a plurality of adsorption columns each packed with an adsorbent capable of preferentially adsorbing ozone thereon sequentially to:

an adsorption step where said adsorbent is maintained at a low temperature to adsorb ozone thereon;

a desorption step where said adsorbent is heated to desorb ozone therefrom, and a scavenger gas is introduced in a substantially fixed amount into said adsorption column to discharge the thus desorbed ozone being carried on said scavenger gas; and a cooling step where said adsorbent having completed said desorption step is cooled to said low temperature as in said adsorption step;

wherein heating of said adsorbent in said desorption step is carried out depending on the ozone concentration of the gas discharged from said adsorption column performing said desorption step.

3. The process for concentrating ozone according to claim 2, wherein said adsorbent in said adsorption column, in said desorption step, is heated when the ozone concentration of said gas discharged from said adsorption column is a preset lower limit level or lower, while heating of said adsorbent is terminated or said adsorbent is cooled when the ozone concentration is a preset upper limit level or higher.

4. The process for concentrating ozone according to claim 3, wherein said desorption step is terminated, when the temperature of said adsorbent has reached the preset upper limit level and the ozone concentration of the gas discharged from said adsorption column drops below the preset lower limit level, in said desorption step, and is switched to said cooling step.

5. A process for concentrating ozone, which comprises switching a plurality of adsorption columns each packed with an adsorbent capable of preferentially adsorbing ozone thereon sequentially to:

an adsorption step where said adsorbent is maintained at a low temperature to adsorb ozone thereon;

a desorption step where said adsorbent is heated to desorb ozone therefrom, and a scavenger gas is introduced in a substantially fixed amount into said adsorption column to discharge the thus desorbed ozone being carried on said scavenger gas; and a cooling step where said adsorbent having completed said desorption step is cooled to said low temperature as in said adsorption step;

wherein the ozone desorbed from said adsorbent is discharged employing a gas having a predetermined pressure as said scavenger gas employed in said desorption step.

6. The process for concentrating ozone according to claim 5, wherein ozone is discharged from said adsorption column after the internal pressure of said adsorption column is allowed to assume a predetermined level.

7. A process for concentrating ozone, which comprises switching a plurality of adsorption columns each packed with an adsorbent capable of preferentially adsorbing ozone thereon sequentially to:

an adsorption step where said adsorbent is maintained at a low temperature to adsorb ozone thereon;

a desorption step where said adsorbent is heated to desorb ozone therefrom, and a scavenger gas is introduced in a substantially fixed amount into said adsorption column to discharge the thus desorbed ozone being carried on said scavenger gas; and a cooling step where said adsorbent having completed said desorption step is cooled to said low temperature as in said adsorption step;

wherein said adsorption step includes a pre-adsorption sub-step and a main adsorption sub-step; said cooling step is followed by said pre-adsorption sub-step; said pre-adsorption sub-step is followed by said main adsorption sub-step; and said main adsorption sub-step is followed by said desorption step; said pre-adsorption sub-step being carried out by introducing an outlet gas from said adsorption column performing said main adsorption step.

8. A process for concentrating ozone, which comprises switching a plurality of adsorption columns each packed with an adsorbent capable of preferentially adsorbing ozone thereon sequentially to:

an adsorption step where said adsorbent is maintained at a low temperature to adsorb ozone thereon;

a desorption step where said adsorbent is heated to desorb ozone therefrom, and a scavenger gas is introduced in a substantially fixed amount into said adsorption column to discharge the thus desorbed ozone being carried on said scavenger gas; and a cooling step where said adsorbent having completed said desorption step is cooled to said low temperature as in said adsorption step;

wherein a low-temperature oxygen from a low-temperature oxygen supply source is employed as a cooling source in said cooling step; said low-temperature oxygen used as said cooling source is then supplied as an ozone-forming raw material to an ozonizer; and an ozone-containing gas generated by said ozonizer is introduced to said adsorption column performing said adsorption step.

* * * * *